United States Patent
Hayashi

(10) Patent No.: US 11,722,627 B2
(45) Date of Patent: Aug. 8, 2023

(54) INFORMATION PROCESSING APPARATUS, IMAGE PROCESSING METHOD, AND STORAGE MEDIUM

(71) Applicant: Seiko Epson Corporation, Tokyo (JP)

(72) Inventor: Ryotaro Hayashi, Shiojiri (JP)

(73) Assignee: Seiko Epson Corporation, Tokyo (JP)

(\*) Notice: Subject to any disclaimer, the term of this patent is extended or adjusted under 35 U.S.C. 154(b) by 0 days.

(21) Appl. No.: 17/536,926

(22) Filed: Nov. 29, 2021

(65) Prior Publication Data

US 2022/0174184 A1 Jun. 2, 2022

(30) Foreign Application Priority Data

Nov. 30, 2020 (JP) ................................ 2020-198277

(51) Int. Cl.
*H04N 1/60* (2006.01)
*H04N 1/00* (2006.01)

(52) U.S. Cl.
CPC ......... *H04N 1/6008* (2013.01); *H04N 1/0044* (2013.01); *H04N 1/00472* (2013.01)

(58) Field of Classification Search
CPC . H04N 1/0044; H04N 1/6008; H04N 1/00472
USPC .................................................. 358/1.9, 1.15
See application file for complete search history.

(56) References Cited

U.S. PATENT DOCUMENTS

| 2013/0135632 A1* | 5/2013 | Yamada | G06K 15/1822 |
| | | | 358/1.9 |
| 2019/0132487 A1* | 5/2019 | Kishimoto | G03G 15/6585 |
| 2019/0158688 A1 | 5/2019 | Murasawa et al. | |

FOREIGN PATENT DOCUMENTS

| JP | 2007-067940 | 3/2007 |
| JP | 2019-093707 | 6/2019 |
| JP | 2019-213114 | 12/2019 |

\* cited by examiner

*Primary Examiner* — Quang N Vo
(74) *Attorney, Agent, or Firm* — Seiko Epson Corporation

(57) ABSTRACT

An information processing apparatus includes a processing section that generates preview data for a preview of a print image by using raster data obtained by performing RIP processing on image data, and a storage section that stores the preview data, in which the image data has a spot color region represented by using a plurality of colors including at least one spot color as a region corresponding to one pixel of the preview data, and when a color replacement of the at least one spot color is performed, the processing section records a color value using an output color of the color replacement in the one pixel.

6 Claims, 7 Drawing Sheets

FIG. 5

| | PIXEL (1) | ... | PIXEL (n) |
|---|---|---|---|
| FIRST CHANNEL | CYAN 10% | ... | NEON YELLOW |
| SECOND CHANNEL | MAGENTA 30% | ... | NEON PINK |
| THIRD CHANNEL | YELLOW 40% | ... | GRAYSCALE 50% |
| FOURTH CHANNEL | BLACK 5% | ... | — |
| FIFTH CHANNEL | RASTER/CMYK | ... | RASTER/— |
| SIXTH CHANNEL | TRANSPARENCY 0% | ... | — |
| SEVENTH CHANNEL | — | | — |

INFORMATION PROCESSING APPARATUS, IMAGE PROCESSING METHOD, AND STORAGE MEDIUM

The present application is based on, and claims priority from JP-Application Serial Number 2020-198277, filed Nov. 30, 2020, the disclosure of which is hereby incorporated by reference herein in its entirety.

BACKGROUND

1. Technical Field

The present disclosure relates to an information processing apparatus, an image processing method, and a storage medium.

2. Related Art

An information processing apparatus has been proposed which performs various types of processing for printing by a printer of an ink jet method, an electrophotographic method, or other methods. This type of information processing apparatus converts image data in a raster format or the like which is created, for example, by image editing software into print data suitable for printing by a printer, and outputs the print data to the printer. Processing such as raster image processor (RIP) processing including rasterizing processing is used for the conversion.

According to a technique described in JP-A-2019-93707, preview image data for displaying a preview image on a display device is generated based on image data. Here, when the image data includes a spot color region to be printed by spot color ink such as metallic ink or neon color ink, a color obtained by replacing the spot color with another color for each spot color region is used in the preview image data.

According to the technique described in JP-A-2019-93707, a preview is displayed by replacing the spot color region with another color. For this reason, an issue occurs that it is difficult to grasp, from the preview, a color of the spot color region where printing is performed using spot color ink such as metallic ink or neon color ink, or gradation based on a plurality of colors including at least one spot color is printed.

SUMMARY

According to an aspect of the present disclosure, there is provided an information processing apparatus including a processing section that generates preview data for a preview of a print image by using raster data obtained by performing RIP processing on image data, and a storage section that stores the preview data, in which the image data has a spot color region represented by using a plurality of colors including at least one spot color as a region corresponding to one pixel of the preview data, and when a color replacement of the at least one spot color included in the image data is performed, the processing section records a color value using an output color of the color replacement in the one pixel.

According to another aspect of the present disclosure, there is provided an image processing method including generating preview data for a preview of a print image by using raster data obtained by performing RIP processing on image data, storing the preview data, in which the image data has a spot color region represented by using a plurality of colors including at least one spot color as a region corresponding to one pixel of the preview data, and recording, when a color replacement of the at least one spot color is performed, a color value using an output color of the color replacement in the one pixel.

According to another aspect of the present disclosure, there is provided a non-transitory computer-readable storage medium storing an image processing program for causing a computer to execute generating preview data for a preview of a print image by using raster data obtained by performing RIP processing on image data, storing the preview data, in which the image data has a spot color region represented by using a plurality of colors including at least one spot color as a region corresponding to one pixel of the preview data, and recording, when a color replacement of the at least one spot color is performed, a color value using an output color of the color replacement in the one pixel.

BRIEF DESCRIPTION OF THE DRAWINGS

FIG. 5 is a diagram illustrating an example of information for each pixel of the preview data.

DESCRIPTION OF EXEMPLARY EMBODIMENTS

Figure 1:
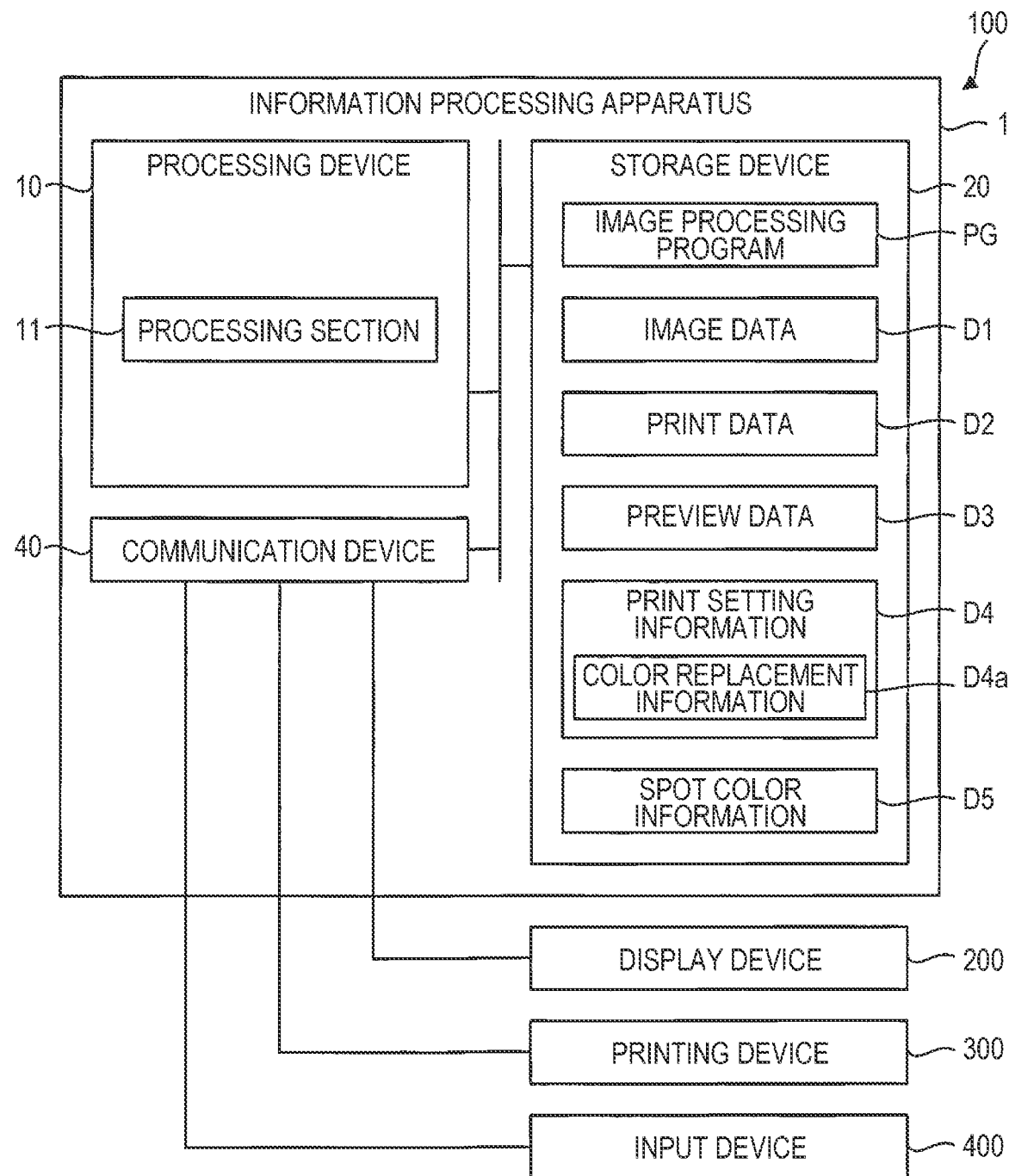
FIG. 1 is a schematic diagram illustrating a configuration example of a system using an information processing apparatus according to an embodiment.

Hereinafter, embodiments of the present disclosure will be described with reference to the accompanying drawings. Note that dimensions or scales of respective parts in the drawings are appropriately different from actual ones, and some parts are schematically illustrated for ease of understanding. Further, the scope of the present disclosure is not limited to these embodiments unless otherwise specified in the following description.

1. EMBODIMENTS

1-1. Outline of System 100 using Information Processing Apparatus 1

FIG. 1 is a schematic diagram illustrating a configuration example of a system 100 using an information processing apparatus 1 according to an embodiment. The system 100 is a system that performs various types of processing related to printing. The system 100 of the present embodiment has a printing function of performing printing and a setting function of performing a print setting such as a color replacement. The setting function includes a preview function of displaying a preview of a print image, and the preview reflects contents of the print setting. Note that the printing function may be implemented in the system 100 as necessary, and may be omitted.

As illustrated in FIG. 1, the system 100 includes the information processing apparatus 1, a display device 200 that is an example of a "display section", a printing device 300, and an input device 400. The information processing apparatus 1 is communicably connected to each of the display device 200, the printing device 300, and the input device 400 in a wired or wireless manner. Note that the printing device 300 may be omitted, or may be communicably connected via a network including the Internet.

The display device 200 is a device that performs displaying under a control of the information processing apparatus 1. More specifically, the display device 200 displays, for example, an image for various types of settings for printing by the printing device 300, and displays an image based on preview data D3 described later as a preview. For example, the display device 200 is a display device including various types of display panels such as a liquid crystal display panel or an organic electro-luminescence (EL) display panel. Note that the display device 200 may be separate from or integrated with the information processing apparatus 1.

The printing device 300 is a device that performs printing on a printing medium under the control of the information processing apparatus 1. More specifically, the printing device 300 prints an image based on print data D2 described later which is input from the information processing apparatus 1 on the printing medium. The printing medium is not particularly limited, and examples thereof include various types of paper, various types of cloths, or various types of films. The printing method of the printing device 300 is not particularly limited, and is, for example, an ink jet method, an electrophotographic method, or other methods. Although not illustrated, the printing device 300 includes, for example, a printer engine of the ink jet method, the electrophotographic method, or other methods, a transport mechanism that transports a printing medium in a predetermined direction, and a control circuit that controls driving of the printer engine and the transport mechanism based on information or the like from the information processing apparatus 1.

The printing device 300 of the present embodiment performs printing using color materials such as ink or toner of a plurality of colors. Examples of the plurality of colors include process colors such as cyan, magenta, yellow, and black. The plurality of colors may include a spot color such as a neon color or a metallic color. Note that the number of colors of the color materials is not particularly limited and is optionally selected.

The input device 400 is a device that accepts an operation from a user. For example, the input device 400 includes a touch pad, a touch panel, or a pointing device such as a mouse. Here, when the input device 400 includes the touch panel, the input device 400 may also serve as the display device 200.

The information processing apparatus 1 is a computer that appropriately performs various types of processing necessary for printing by the printing device 300 and display by the display device 200 in response to an operation to the input device 400. Specifically, the information processing apparatus 1 generates data such as print data D2 for use in the printing by the printing device 300 and generates data such as the preview data D3 for use in the display by the display device 200 based on image data D1 input from the outside.

Further, the information processing apparatus 1 can change various types of settings of the printing by the printing device 300. The information processing apparatus 1 has a preview update function, and when a preview update is accepted, the information processing apparatus 1 causes the display device 200 to display a preview reflecting the contents of the print setting. Hereinafter, a configuration of the information processing apparatus 1 will be described.

1-2. Configuration of Information Processing Apparatus 1

As illustrated in FIG. 1, the information processing apparatus 1 includes a processing device 10, a storage device 20 that is an example of a "storage section", and a communication device 40. These devices are communicably connected to one another.

The processing device 10 is a device having a function of controlling each section of the information processing apparatus 1 and a function of processing various types of data. The processing device 10 includes, for example, a processor such as a central processing unit (CPU). Note that the processing device 10 may be configured by a single processor or may be configured by a plurality of processors. A part or all of the functions of the processing device 10 may be implemented by hardware such as a digital signal processor (DSP), an application-specific integrated circuit (ASIC), a programmable logic device (PLD), or a field-programmable gate array (FPGA).

The storage device 20 is a device that stores various types of programs executed by the processing device 10 and various types of data processed by the processing device 10. The storage device 20 includes, for example, a hard disk drive or a semiconductor memory. Note that a part or all of the storage device 20 may be provided in a storage device, a server, or the like outside the information processing apparatus 1.

An image processing program PG, the image data D1, the print data D2, the preview data D3, and print setting information D4 are stored in the storage device 20 of the present embodiment. The image processing program PG is a program for causing the information processing apparatus 1 to execute an image processing method described later.

The image data D1 is data created by image editing software or the like. Specifically, for example, the image data D1 may be data in a file format based on a page description language such as PostScript, Portable Document Format (PDF), or XML Paper Specification (XPS) or in various types of vector formats, data in a raster format that does not match a processing condition such as an output resolution in the printing device 300, or the like.

The image data D1 includes information related to a spot color. In particular, the image data D1 has one or more spot color regions represented by using at least one spot color. Therefore, the image data D1 includes information related to the one or more spot color regions. Each of the one or more spot color regions is a region corresponding to one pixel of the preview data D3. Note that the spot color region may be a gradation region represented by using a plurality of spot colors, or may be a gradation region represented by using at least one spot color and a process color. In addition to the spot color region, the image data D1 may include one or more regions represented by using only a process color as a region corresponding to one pixel of the preview data D3.

The print data D2 is data in a format that can be processed by the printing device 300. Specifically, the print data D2 is data in a raster format that matches a processing condition such as an output resolution in the printing device 300, for example.

The preview data D3 is data used for displaying a preview on the display device 200. The preview data D3 may be data itself which is processed by the display device 200, or may be original data or intermediate data for generating the data to be processed by the display device 200.

The preview data D3 is preferably data having smaller processing load required to be displayed on the display device 200 than that of each of the image data D1 and the print data D2. Specifically, the preview data D3 is preferably data smaller in size than the print data D2. In this case, by using the preview data D3 for displaying the preview, as compared with a case in which the image data D1 or the print data D2 is used, the time required for displaying the preview can be shortened.

The file format of the preview data D3 is not particularly limited, but is preferably a format in which information such as a color value is described for each pixel as illustrated in FIG. 5 which will be described in detail later, like data in a raster format or data in an equivalent format thereof, for example, from the viewpoint that the processing load at the time of the display of the preview is smaller than that of the data in the vector format. Here, the preview data D3 includes color related information in which a process color and a spot color are distinguished from each other for each pixel as will be described in detail later. For this reason, even when the setting related to the spot color is changed, the preview can be appropriately updated using the preview data D3 without using the image data D1.

The print setting information D4 is information related to various types of settings of the printing by the printing device 300. In the example illustrated in FIG. 1, the print setting information D4 includes color replacement information D4a. The color replacement information D4a is information indicating that a part or all of the colors included in the image data D1 or the print data D2 are replaced with other colors. The print setting information D4 includes change history information related to a setting change history in addition to the setting information of the color replacement information D4a.

Note that the information included in the print setting information D4 is not limited to the color replacement information D4a. For example, the print setting information D4 may include information related to a setting of a profile such as an input profile applied to the image data D1. The profile is embedded in the image data D1 or implemented in the image processing program PG, and includes a conversion table for converting a color value in one color space as an input value into a color value in another color space as an output value. A format of the profile is not particularly limited, but conforms to International Color Consortium (ICC) specifications, for example.

Spot color information D5 is information related to at least one spot color used in the above-described spot color region of the image data D1. A format of the spot color information D5 is not particularly limited, but is, for example, a list format of a plurality of spot colors used in the above-described spot color region.

The communication device 40 is an interface that is communicably connected to external devices such as the display device 200, the printing device 300, and the input device 400. For example, the communication device 40 includes interfaces such as a universal serial bus (USB) interface and a local area network (LAN) interface. Note that the communication device 40 may be wirelessly connected to the external device by Wi-Fi, Bluetooth, or the like, or may be connected to the external device via the local area network (LAN), the Internet, or the like. Note that Wi-Fi and Bluetooth are both registered trademarks.

In the information processing apparatus 1 having the above-described configuration, the processing device 10 reads and executes the image processing program PG from the storage device 20. By this execution, the processing device 10 functions as a processing section 11. The processing section 11 has a function of accepting an instruction from a user through the input device 400 and a function of controlling operations of the display device 200 and the printing device 300.

The processing section 11 generates the print data D2 and the preview data D3 based on the image data D1. RIP processing including rasterization processing for the image data D1 is used to generate both the print data D2 and the preview data D3. The setting indicated by the print setting information D4 described above is appropriately applied to the RIP processing. Note that in the present specification, the "RIP processing" is a concept including not only processing for converting data in a vector format into data in a raster format but also processing for converting data in a raster format into data in a raster format having a different resolution or the like.

Figure 3:
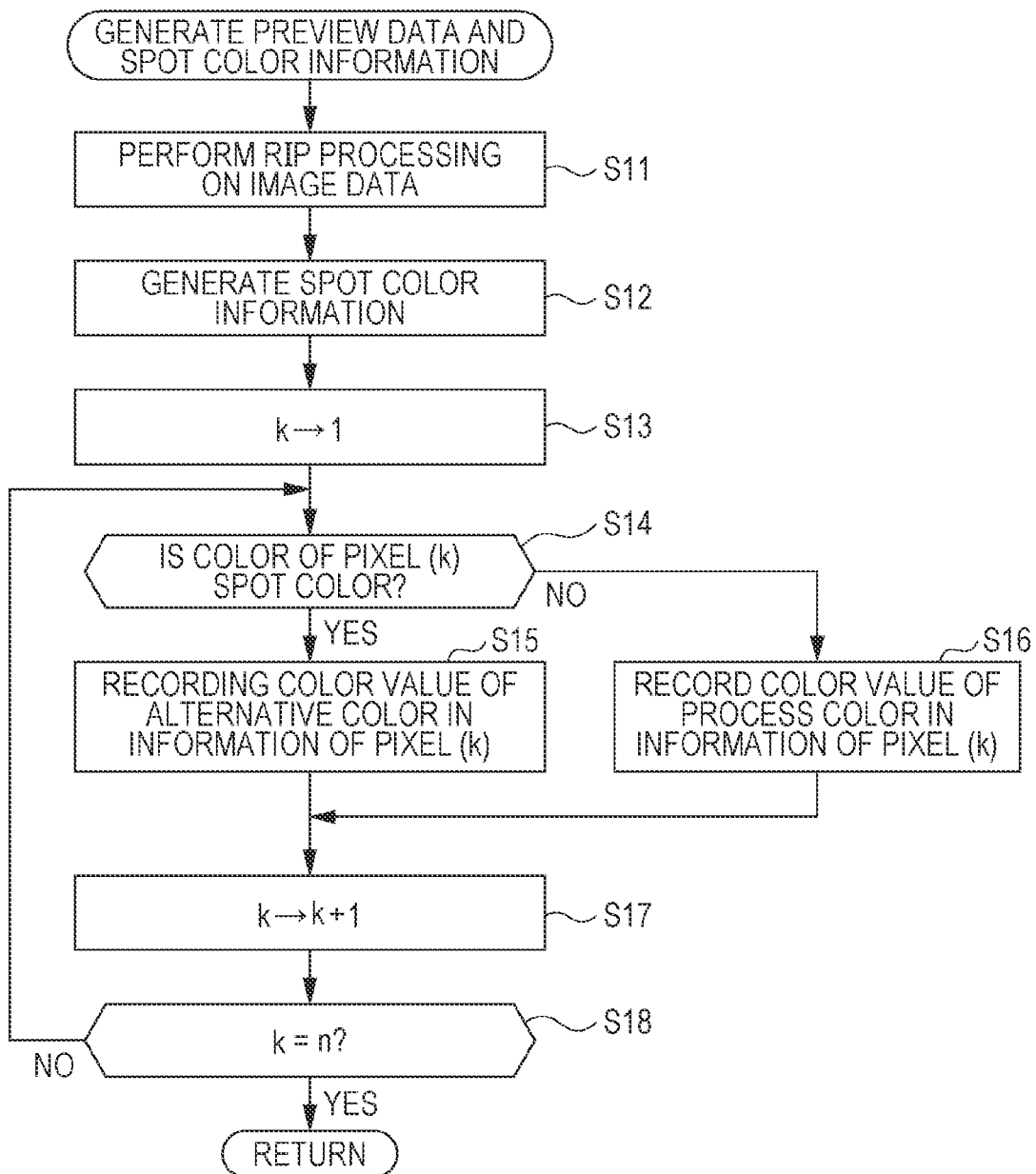
FIG. 3 is a flowchart illustrating an example of generation of preview data and spot color information.
Figure 4:
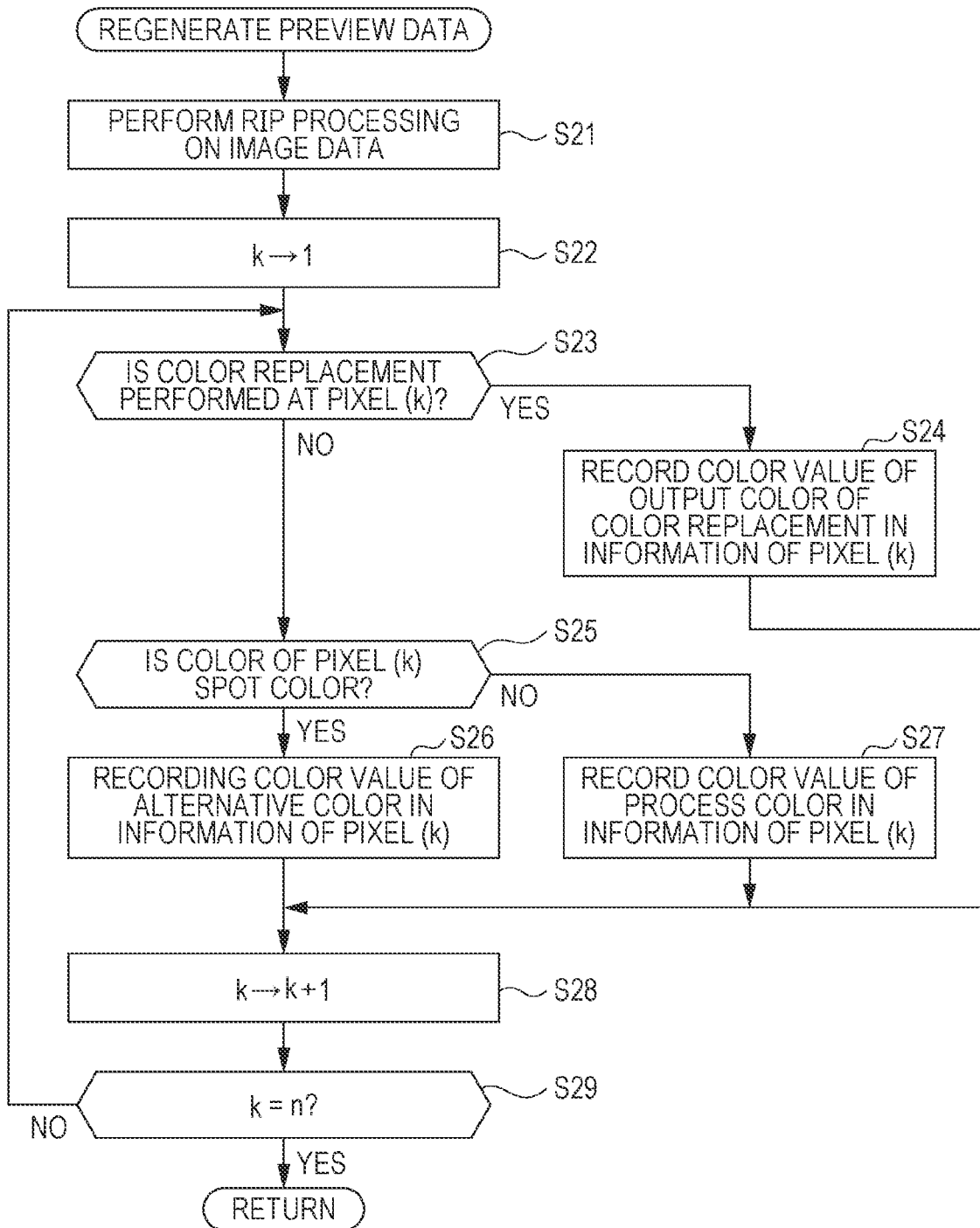
FIG. 4 is a flowchart illustrating an example of regeneration of the preview data.

The generation of the preview data D3 uses, in addition to the above-described RIP processing, processing for recording information related to a color for each pixel which is obtained by an analysis at the time of the RIP processing in the preview data D3 as illustrated in FIG. 3 and FIG. 4 which will be described in detail later. Here, the processing section 11 generates the spot color information D5 using the above-described information. The generated spot color information D5 is stored in the storage device 20.

Note that the RIP processing used to generate the preview data D3 may be processing in the same process as the RIP processing used to generate the print data D2 or may be processing in a different process. When the RIP processing used to generate the preview data D3 is the processing in a different process from that of the RIP processing used to generate the print data D2, these processing contents may be different from each other. For example, the resolution of the raster data obtained by the RIP processing used to generate the preview data D3 may be different from the resolution of the raster data obtained by the RIP processing used to generate the print data D2, and is preferably smaller than the resolution of the raster data obtained by the RIP processing used to generate the print data D2.

In addition, as illustrated in FIG. 5 which will be described later in detail, the processing section 11 causes the display device 200 to display an image used for the printing by the printing device 300 and for the printing setting. The image is a graphical user interface (GUI) image for accepting an instruction from the user via the input device 400. Here, the processing section 11 changes the print setting based on the instruction. In addition, the processing section 11 updates the print setting information D4 according to the contents of the change.

1-3. Operation of Information Processing Apparatus 1

Figure 2:
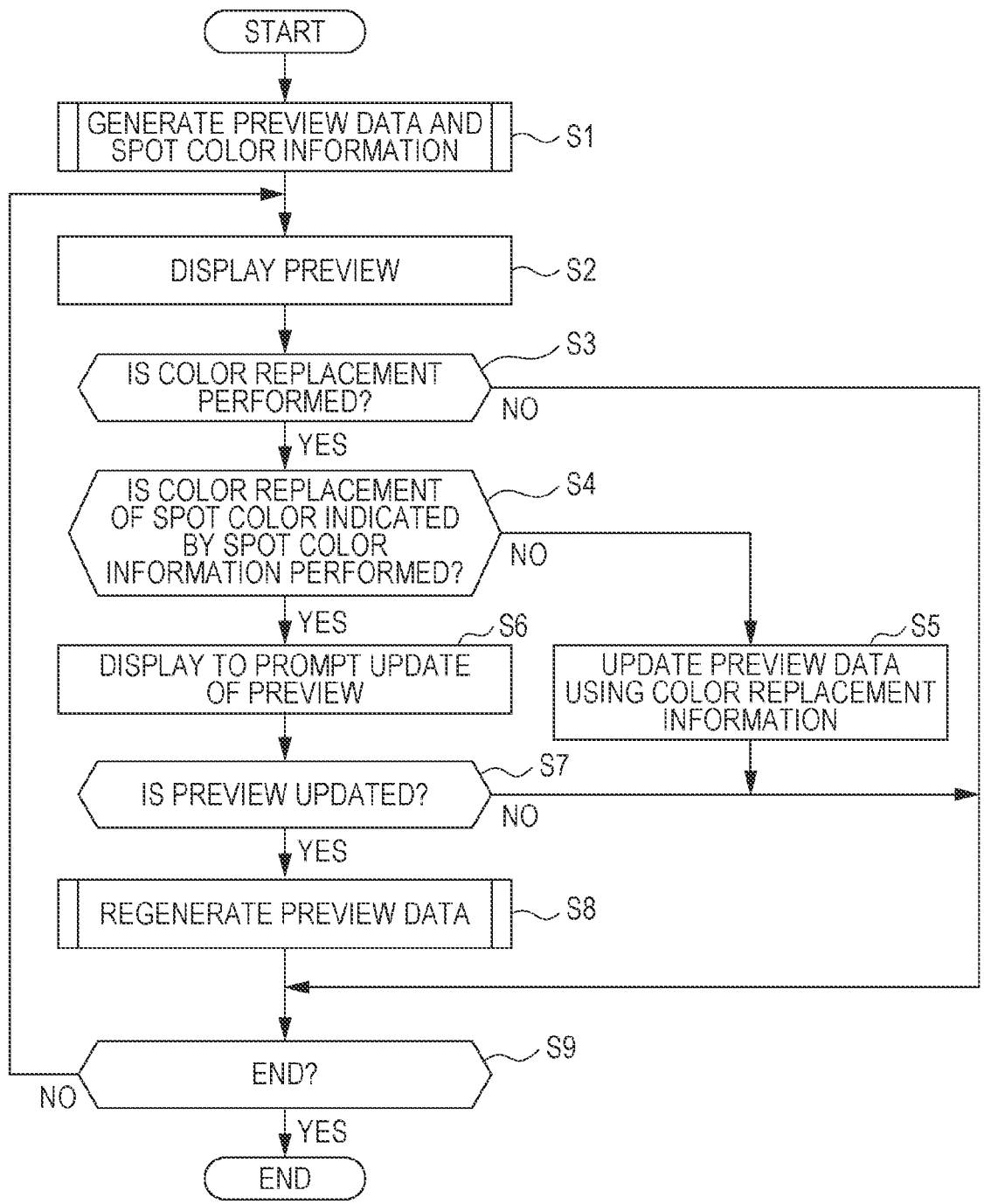
FIG. 2 is a flowchart illustrating an image processing method according to the embodiment.

FIG. 2 is a flowchart illustrating an image processing method according to the embodiment. The image processing method is performed using the information processing apparatus 1. First, in step S1, the processing section 11 generates the preview data D3 and spot color information D5. This generation is performed by processing including the RIP processing of the image data D1. The generated preview data D3 and spot color information D5 are stored in the storage device 20. Note that the generation of the preview data D3 and the spot color information D5 will be described in detail with reference to FIG. 3 below.

Next, in step S2, the processing section 11 causes the display device 200 to display an image based on the preview data D3 as a preview. Thereafter, in step S3, the processing section 11 determines whether or not the color replacement is performed. This determination is made based on, for example, the color replacement information D4a or the change history information which are included in the print setting information D4. When the color replacement is not performed, the processing section 11 determines in step S9 whether or not there is an instruction to end. When there is no instruction to end, the processing section 11 proceeds to step S2. On the other hand, when there is an instruction to end, the processing is ended. Therefore, when the color replacement is not performed, the processing section 11 repeats the above-described step S2 and step S3 until there is an instruction to end.

On the other hand, when the color replacement is performed, in step S4, the processing section 11 determines whether or not the color replacement of the spot color indicated by the spot color information D5 is performed. This determination is made based on, for example, the color replacement information D4a or the change history information which are included in the print setting information D4, and the spot color information D5. When the color replacement of the color other than the spot color indicated by the spot color information D5 is performed, in step S5, the processing section 11 updates the preview data D3 using the color replacement information D4a. This update is performed, for example, by replacing the color value of the corresponding pixel of the preview data D3 stored in the storage device 20 with a color value of an output color of the color replacement. After this update, the processing section 11 proceeds to step S9 described above. As a result, when there is no instruction to end, an image based on the updated preview data D3 is displayed as a preview.

On the other hand, when the color replacement of the spot color indicated by the spot color information D5 is performed, in step S6, the processing section 11 causes the display device 200 to display information for prompting the update of the preview. The display is performed by, for example, a status display or the like in an image GU illustrated in FIG. 6 below.

Thereafter, in step S7, the processing section 11 determines whether or not the update of the preview is accepted. When the update of the preview is not accepted, the processing section 11 proceeds to step S9 described above. Therefore, when the update of the preview is not accepted, the processing section 11 repeats the above-described step S2, step S3, step S4, step S6, step S7, and step S9 until there is an instruction to end.

On the other hand, when the update of the preview is accepted, the processing section 11 regenerates the preview data D3 in step S8. This regeneration is performed by processing including the RIP processing of the image data D1 without using the preview data D3 stored in the storage device 20. The regenerated preview data D3 is stored in the storage device 20. At this time, the already stored preview data D3 is overwritten by the regenerated preview data D3, for example. After such regeneration, the processing section 11 proceeds to step S9 described above. As a result, when there is no instruction to end, an image based on the regenerated preview data D3 is displayed as a preview. Note that the regeneration of the preview data D3 will be described in detail with reference to FIG. 4 below.

FIG. 3 is a flowchart illustrating an example of the generation of the preview data D3 and the spot color information D5. Hereinafter, the above-described step S1 will be specifically described with reference to FIG. 3. FIG. 3 illustrates an example in which the RIP processing is performed on the image data D1, and the preview data D3 is generated using the raster data composed of n pixels obtained by the RIP processing. In FIG. 3, the k-th pixel among the n pixels is represented as a pixel (k). Where n is a natural number of 1 or more, and k is a natural number greater than or equal to 1 and less than or equal to n.

As illustrated in FIG. 3, first, in step S11, the processing section 11 performs RIP processing on the image data D1. Raster data composed of n pixels is generated by the RIP processing. In addition, in the RIP processing, information related to a color is analyzed for each pixel of the raster data. The raster data is stored in the storage device 20 together with information of the analysis. Here, it is sufficient when n is a natural number of 1 or more, and n is not particularly limited, but is preferably the number corresponding to the number of pixels having a resolution higher than or equivalent to the display resolution of the display device 200, and also the number corresponding to the number of pixels having a resolution lower than or equivalent to the resolution of the print data D2. Note that the raster data may be the print data D2.

Next, in step S12, the processing section 11 generates the spot color information D5. This generation is performed, for example, based on the information of the analysis in the above-described RIP processing.

Next, in step S13, the processing section 11 sets 1 in k. Thereafter, in step S14, the processing section 11 determines whether or not the color of the pixel (k) is a spot color. This determination is made based on the information of the analysis in the RIP step S11 described above.

When the color of the pixel (k) is the spot color, in step S15, the processing section 11 records a color value of an alternative color, which is a color approximated to the spot color by a process color, in the information of the pixel (k) of the raster data. On the other hand, when the color of the pixel (k) is not a spot color, in step S16, the processing section 11 records a color value of the process color in the information of the pixel (k) of the raster data. Note that in step S15 and step S16, when the pixel (k) is represented by color values of two or more colors, a color value obtained by adding the color values of the two or more colors is recorded in the information of the pixel (k). The pixel (k) represented by the color values of the two or more colors is a part of a gradation region in which the amounts of ink of two colors are gradually increased or decreased for each pixel, for example.

After step S15 and step S16 described above, the processing section 11 sets k+1 in k in step S17. Thereafter, in step S18, the processing section 11 determines whether k=n or not. When it is not k=n, the processing section 11 returns to the step S14 described above. On the other hand, when k=n, the processing section 11 proceeds to step S2 illustrated in FIG. 2 described above.

According to the above-described steps S11 to S18, the preview data D3 that is composed of the n pixels and includes the information related to the color for each pixel is generated, and also the spot color information D5 is generated.

FIG. 4 is a flowchart illustrating an example of the regeneration of the preview data D3. Hereinafter, the above-described step S8 will be specifically described with reference to FIG. 4. FIG. 4 illustrates an example in which the RIP processing is performed on the image data D1, and the preview data D3 is generated using the raster data composed of n pixels obtained by the RIP processing. In FIG. 4, the k-th pixel among the n pixels is represented as a pixel (k). Where n is a natural number of 1 or more, and k is a natural number greater than or equal to 1 and less than or equal to n. Note that the processing illustrated in FIG. 4 is similar to the processing illustrated in FIG. 3 described above except that the generation of the spot color information D5 is omitted and the color value corresponding to the presence or absence of the color replacement is recorded in the pixel (k).

As illustrated in FIG. 4, first, in step S21, the processing section 11 performs the RIP processing on the image data D1 in the similar manner as in step S11 illustrated in FIG. 3 described above. Next, in step S22, the processing section 11 sets 1 in k. Thereafter, in step S23, the processing section 11 determines whether or not the color replacement for the pixel (k) is performed. This determination is made based on, for example, the color replacement information D4a or the change history information which are included in the print setting information D4.

When the color replacement for the pixel (k) is performed, in step S24, the processing section 11 records a color value of an output color of the color replacement in the information of the pixel (k) of the raster data generated in step S21. Here, when the pixel (k) is represented by two or more colors, a color value obtained by adding color values of the two or more colors is recorded in the information of the pixel (k). When the color replacement of a part of the two or more colors is performed, a color value obtained by adding a color value of an output color of the color replacement and a color value of the remaining part of the two or more colors is recorded in the information of the pixel (k). When the remaining part is a spot color, a color value obtained by adding the color value of the output color of the color replacement and a color value of an alternative color of the spot color of the remaining part is recorded in the information of the pixel (k).

When the color replacement for the pixel (k) is not performed, the processing section 11 determines whether or not the color of the pixel (k) is a spot color in step S25 in the similar manner as in step S14 illustrated in FIG. 3 described above.

When the color of the pixel (k) is the spot color, in step S26, the processing section 11 records the color value of the alternative color, which is a color approximated to the spot color by a process color, in the information of the pixel (k) of the raster data in the similar manner as in step S15 illustrated in FIG. 3 described above. On the other hand, when the color of the pixel (k) is not the spot color, in step S27, the processing section 11 records a color value of the process color in the information of the pixel (k) of the raster data in the similar manner as in step S16 illustrated in FIG. 3 described above.

After step S24, step S26, and step S27 as described above, the processing section 11 sets k+1 in k in step S28. Thereafter, in step S29, the processing section 11 determines whether k=n. When it is not k=n, the processing section 11 returns to the step S23 described above. On the other hand, when k=n, the processing section 11 proceeds to step S9 illustrated in FIG. 2 described above.

By the above-described steps S21 to S29, the preview data D3 that is composed of the n pixels and also includes the information related to the color reflecting the information of the color replacement information D4a for each pixel is regenerated.

According to the above-described image processing method, in step S1 or step S8 described above, the preview data D3 for the preview of the print image is generated using the raster data obtained by performing the RIP processing on the image data D1. In step S1 or step S8, the preview data D3 is stored. Here, the image data D1 has a spot color region represented by using at least one spot color as a region corresponding to one pixel of the preview data D3. In step S24 described above, when the color replacement of the at least one spot color is performed, a color value using an output color of the color replacement is recorded in the one pixel.

FIG. 5 is a diagram illustrating an example of information D3a for each pixel of the preview data D3. FIG. 5 illustrates an example in which information indicating a process color is recorded in the information D3a of the first pixel (1) and information indicating a spot color is recorded in the information D3a of the n-th pixel (n). In addition, FIG. 5 exemplifies a case in which the process color is CMYK and also the spot color is a neon color.

In the example illustrated in FIG. 5, the information D3a of a pixel is represented by using seven channels. Specifically, when the pixel uses the process color, a usage rate of cyan is recorded in the first channel, a usage rate of magenta is recorded in the second channel, a usage rate of yellow is recorded in the third channel, and a usage rate of black is recorded in the fourth channel. Information indicating whether a data format of the image data D1 is the vector format or the raster format and information of a color space of an input are recorded in the fifth channel, and auxiliary data is recorded in each of the sixth channel and the seventh channel.

On the other hand, when the pixel uses a spot color, a spot color name or a spot color ID is recorded in each of the first channel and the second channel, a grayscale is recorded in the third channel, the fourth channel is a spare channel, information indicating whether the format of the image data D1 is the vector format or the raster format and information of the color space of the input are recorded in the fifth channel, and each of the sixth channel and the seventh channel is an empty channel. The spot color ID is associated with a name of a corresponding spot color, a color value of the spot color, or a color value of an alternative color that can be displayed in the preview. When a plurality of spot colors are included, the spot color ID may be associated with names of the plurality of corresponding spot colors, and when at least one spot color and a process color are included, the spot color ID may be associated with a color value obtained by adding a color value of the spot color or the alternative color and a color value of the process color.

As described above, the information D3a related to the color is recorded for each pixel in the preview data D3. Note that the information D3a for each pixel of the preview data D3 is not limited to the example illustrated in FIG. 5.

Figure 6:
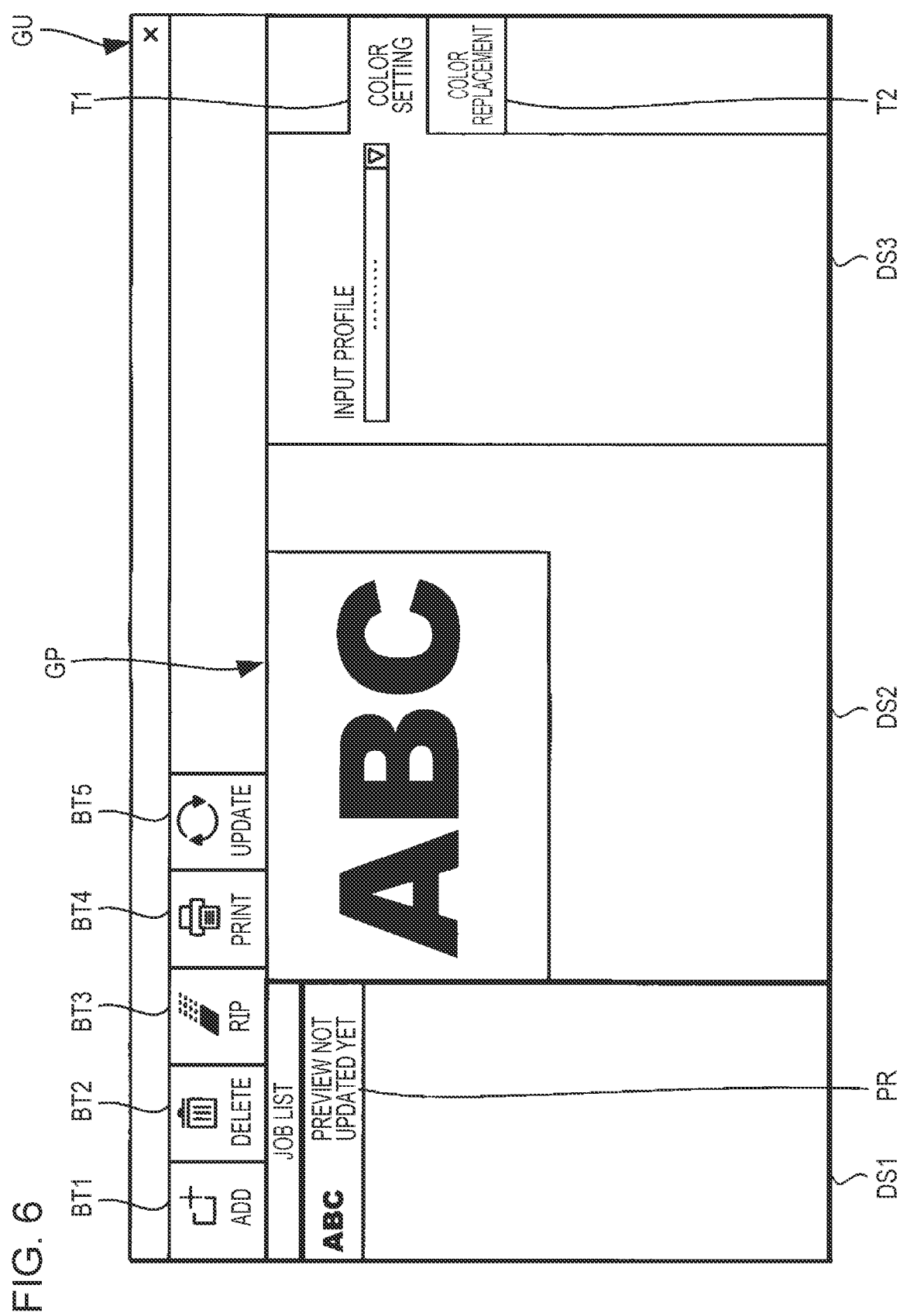
FIG. 6 is a diagram illustrating an example of an image for generating print data and displaying a preview.

FIG. 6 is a diagram illustrating an example of an image GU for generating the print data D2 and displaying a preview. With the execution of the image processing program PG, for example, as illustrated in FIG. 6, the information processing apparatus 1 causes the display device 200 to display the image GU for GUI which includes a preview image GP based on the above-described preview data D3 as an application window. Not that although FIG. 6 exemplifies a case in which the preview image GP represents characters "ABC", the contents of the preview image GP are not limited to the example illustrated in FIG. 6 and are optionally selected.

The image GU includes buttons BT1 to BT5 and display fields DS1 to DS3 in addition to the preview image GP.

The button BT1 is a button for inputting the image data D1. One or more pieces of the image data D1 added by the operation of the button BT1 are displayed in the display field DS1. When a plurality of pieces of the image data D1 are displayed in the display field DS1, one of the plurality of pieces of image data D1 can be selected. In addition, the example illustrated in FIG. 6 represents the display field DS1 in a state in which a status display PR, which is an example of information for prompting the update of the preview in step S6 described above, is displayed. Note that display contents of the status display PR may be any contents as long as the display contents prompt the user to update the preview, and are not limited to the example illustrated in FIG. 6.

The button BT2 is a button for deleting the image data D1 displayed in the display field DS1. By operating this button, the display of the image data D1 is deleted from the display field DS1. Here, when the plurality of pieces of image data D1 are displayed in the display field DS1, the selected image data D1 is deleted from the display field DS1.

The button BT3 is a button for performing the RIP processing on the image data D1. By operating this button, the processing in step S1 and step S2 in FIG. 2 described above is executed for the image data D1 displayed in the display field DS1. As a result of the processing, the print data D2 and the preview data D3 are generated, and also the preview image GP based on the preview data D3 is displayed in the display field DS2. Here, when the plurality of pieces of image data D1 are displayed in the display field DS1, the processing is executed on the selected image data D1.

The button BT4 is a button for printing an image based on the print data D2. By operating this button, the printing device 300 prints the image based on the print data D2. Here, when the operation of the button BT3 is not yet performed, the above-described RIP processing is performed and then the printing is performed by the printing device 300. When the plurality of pieces of image data D1 are displayed in the display field DS1, the printing of the selected image data D1 is executed.

The button BT5 is a button for updating the preview image GP. By operating this button, the processing in step S8 in FIG. 2 described above is executed for the image data D1 displayed in the display field DS1. The preview image GP is updated by the processing.

The display field DS3 includes a tab T1 and a tab T2 that can be alternatively selected. When the tab T1 is selected, an image for a color setting including a setting of a profile is displayed in the display field DS3. The setting of the profile can be changed by an operation on the image. When the tab T2 is selected, an image for a color replacement setting is displayed in the display field DS3. The setting of color replacement can be changed by an operation on the image. Note that the display of the color setting in the display field DS3 may be provided as necessary, and may also be omitted.

The aforementioned information processing apparatus 1 includes the processing section 11 and the storage device 20 which is an example of the "storage section" as described above. The processing section 11 generates the preview data D3 for the preview of the print image by using the raster data obtained by performing the RIP processing on the image data D1. The storage device 20 stores the preview data D3. Here, the image data D1 has a spot color region represented by using at least one spot color as a region corresponding to one pixel of the preview data D3.

In particular, as described above, when the color replacement of at least one spot color is performed, the processing section 11 records a color value using an output color of the color replacement in the one pixel. Therefore, when the color replacement is performed with regard to the spot color, the preview reflecting a result of the color replacement can be displayed based on the preview data D3.

According to the present embodiment, as described above, when the color replacement of at least one spot color is performed, the processing section 11 causes the display device 200, which is an example of the "display section", to display the status display PR as information for prompting the update of the preview. Thus, it is possible to notify that the contents after the color replacement are not reflected in the preview. In addition, with this display, the preview can be updated after waiting for an instruction from the user. Therefore, by updating the preview only when the user desires, the processing load of the processing section 11 can be reduced.

In addition, as described above, when the update of the preview is accepted and also the color replacement of at least one spot color is performed, the processing section 11 regenerates the preview data D3 using the RIP processing described above. Thus, it is possible to generate the preview data D3 reflecting the result of the color replacement by using the information of the spot color included in the image data D1. Further, since the already generated preview data D3 is not used for the regeneration, it is not necessary to record the information related to the spot color in the preview data D3. Thus, it is possible to reduce the size of the preview data D3, and as a result, it is possible to quickly update the preview data D3 which is not accompanied by the regeneration.

Further, as described above, when the color replacement of a color other than the spot color is performed, the processing section 11 updates the preview data D3 based on the color replacement information D4a related to the color replacement without performing the above-described RIP processing. Thus, as compared with a case in which the RIP processing is used to regenerate the preview data D3, the preview can be more quickly updated.

As described above, the processing section 11 generates the print data D2 separately from the preview data D3 based on the image data D1. Thus, the preview data D3 can be set in a format suitable for the preview. For example, it is possible to set the size of the preview data D3 to be smaller than that of the image data D1. As a result, as compared with a case in which the image data D1 is used for the preview, the preview can be more quickly displayed.

2. MODIFIED EXAMPLE

The above-described respective exemplified embodiments may be modified in various ways. Specific modification aspects applicable to the above-described respective embodiments will be exemplified below. It should be noted that two or more aspects optionally selected from the following examples may be appropriately combined as long as they do not contradict each other.

According to the above-described embodiment, when the color replacement of the color other than the spot color indicated by the spot color information D5 is performed, the preview data D3 is updated without waiting for an instruction of the preview update from the user, but the configuration is not limited to this. For example, the preview data D3 may be updated when the instruction of the preview update from the user is accepted also in a case in which the color replacement of the color other than the spot color indicated by the spot color information D5 is performed.

Figure 7:
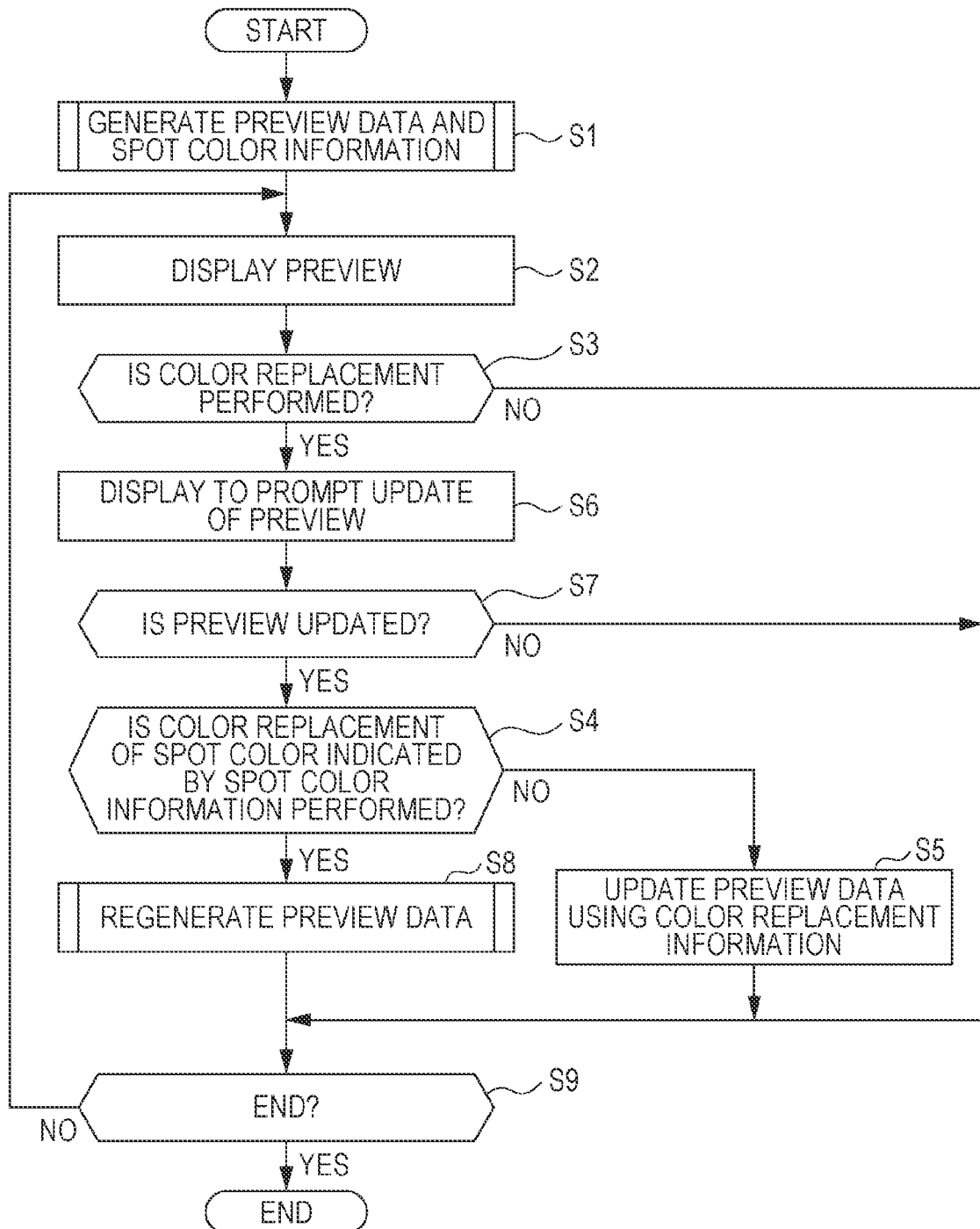
FIG. 7 is a flowchart illustrating an image processing method according to a modified example.

FIG. 7 is a flowchart illustrating an image processing method according to a modified example. The method illustrated in FIG. 7 is similar to the method illustrated in FIG. 2 described above except that the preview data D3 is updated when the instruction of the preview update from the user is accepted also in a case in which the color replacement of the color other than the spot color indicated by the spot color information D5 is performed. In FIG. 7, the same processing as that in FIG. 2 is denoted by the same reference sign.

To be specific, after step S3, step S6 is performed. Then, after step S7, step S4 is performed. Here, when it is determined in step S4 that the color replacement of the color indicated by the spot color information D5 is performed, step S8 is performed. On the other hand, when it is determined in step S4 that the color replacement of the color indicated by the spot color information D5 is not performed, step S5 is performed. According to the modified example illustrated in FIG. 7 described above too, similarly as in the above-described embodiment, when the color replacement is performed with regard to the spot color, the preview reflecting the result of the color replacement can be displayed based on the preview data D3.

In the above-described embodiment, a configuration in which the image processing program PG is installed in a computer such as a personal computer is exemplified, but the present disclosure is not limited to the above-described configuration. For example, the image processing program PG may be installed in an output device such as a printer or a portable device such as a tablet terminal or a smartphone.

What is claimed is:

1. An information processing apparatus comprising:
    a processing section that generates preview data for a preview of a print image by using raster data obtained by performing RIP processing on image data; and
    a storage section that stores the preview data, wherein
    the image data has a spot color region represented by using a plurality of colors including at least one spot color as a region corresponding to one pixel of the preview data,
    when a color replacement of the at least one spot color included in the image data is to be performed, the processing section causes the display section to display a notification prompting a user to select to update the preview, and
    when the user selects to update the preview, the color replacement of the at least one spot color included in the image data is performed, the processing section recording a color value using an output color of the color replacement in the one pixel.

2. The information processing apparatus according to claim 1, wherein when the update of the preview is accepted and also the color replacement of at least one spot color is performed, the processing section regenerates the preview data by using the RIP processing.

3. The information processing apparatus according to claim 1, wherein when a color replacement of a color other than the spot color is performed, the processing section does not perform the RIP processing and updates the preview data based on color replacement information in a case in which the color replacement of the color other than the spot color is performed.

4. The information processing apparatus according to claim 1, wherein the processing section generates print data separately from the preview data based on the image data.

5. An image processing method comprising:
    generating preview data for a preview of a print image by using raster data obtained by performing RIP processing on image data;
    storing the preview data, wherein the image data has a spot color region represented by using a plurality of colors including at least one spot color as a region corresponding to one pixel of the preview data;
    displaying, when a color replacement of the at least one spot color is to be performed, a notification prompting a user to select to update the preview, and
    recording, when the user selects to update the preview and when the color replacement of the at least one spot color is performed, a color value using an output color of the color replacement in the one pixel.

6. A non-transitory computer-readable storage medium storing an image processing program for causing a computer to execute:
    generating preview data for a preview of a print image by using raster data obtained by performing RIP processing on image data;
    storing the preview data, wherein the image data has a spot color region represented by using a plurality of colors including at least one spot color as a region corresponding to one pixel of the previewe data; and
    displaying, when a color replacement of the at least one spot color is to be performed, a notification prompting a user to select to update the preview, and
    recording, when the user selects to update the preview and when the color replacement of the at least one spot color is performed, a color value using an output color of the color replacement in the one pixel.

* * * * *